United States Patent [19]

Morishita et al.

[11] 4,373,672

[45] Feb. 15, 1983

[54] ROTARY TYPE ELECTROSTATIC SPRAY PAINTING DEVICE

[75] Inventors: Teru Morishita, Shizuoka; Yoshimichi Ishioka, Susono; Toshikazu Suzuki, Toyota, all of Japan

[73] Assignee: Toyota Jidosha Kogyo Kabushiki Kaisha, Toyota, Japan

[21] Appl. No.: 230,112

[22] Filed: Jan. 29, 1981

[30] Foreign Application Priority Data

Aug. 6, 1980 [JP] Japan ............................ 55-107075

[51] Int. Cl.[3] ........................ B05B 5/04; F16C 32/06

[52] U.S. Cl. .................................... 239/703; 239/223

[58] Field of Search ............................ 285/222, 382.4; 239/700-703, 223, 224; 308/9, 10, DIG. 1

[56] References Cited

U.S. PATENT DOCUMENTS 2,217,000 10/1940 Barnes ................................ 285/222
3,390,499 7/1968 Jansson .......................... 285/222 X
3,985,405 10/1976 Okano et al. ............ 308/DIG. 1 X
4,148,932 4/1979 Tada et al. ..................... 239/700 X

FOREIGN PATENT DOCUMENTS 2336181 7/1977 France ............................... 239/703
1213959 11/1970 United Kingdom .................... 308/9

*Primary Examiner*—Andres Kashnikow
*Attorney, Agent, or Firm*—Kenyon & Kenyon

[57] ABSTRACT

A rotary type electrostatic spray painting device comprising a rotary shaft and a spray head fixed onto the front end of the rotary shaft. Paint is fed onto the cup-shaped inner wall of the spray head. The rotary shaft is supported by a single thrust air bearing and a pair of radial air bearings. An electrode, continuously contacting the rear end of the rotary shaft, is provided. A negative high voltage is applied to the housing of the paint device. In addition, the negative high voltage is also applied to the spray head via the electrode and the rotary shaft. The spray head comprises a spray head body and a spray head supporting member. The spray head body has a cylindrical inner circumferential wall which is fitted onto the cylindrical outer circumferential wall of the spray head supporting member. A radially inwardly projecting annular projection is formed on the rear end of the cylindrical inner circumferential wall of the spray head body. A thin extending portion, passing through the annular projection and extending backward from the rear end of the spray head supporting member, is formed in one piece on the rear end of the spray head supporting member. The tip of the thin extending portion is radially outwardly bent and pressed onto the rear end face of the annular projection.

18 Claims, 7 Drawing Figures

Fig. 6
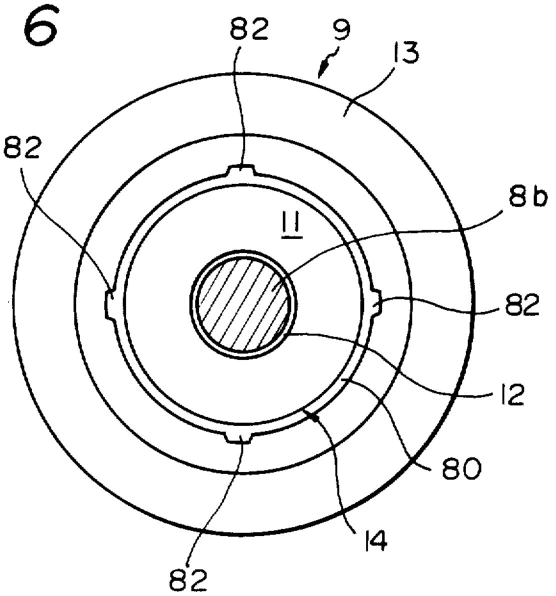
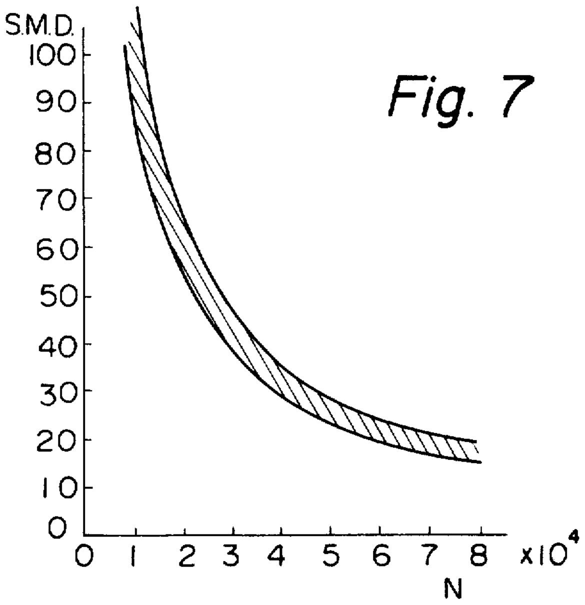
Fig. 7

ROTARY TYPE ELECTROSTATIC SPRAY PAINTING DEVICE

BACKGROUND OF THE INVENTION

The present invention relates to a rotary type electrostatic spray painting device.

One known electrostatic spray painting device which has been used for painting, for example, bodies of motor cars, is of the rotary type and comprises a rotary shaft supported by ball bearings or roller bearings arranged within the housing of the painting device, and a cup-shaped spray head fixed onto the front end of the rotary shaft. In this painting device, a negative high voltage is applied to the spray head, and paint is fed onto the inner circumferential wall of the spray head. Thus, fine paint particles charged with electrons are sprayed from the spray head and are attracted by an electrostatic force onto the surface of the body of a motor car, which is grounded. As a result of this, the surface of the body of a motor car is painted. In such a rotary type electrostatic spray painting device, about 90 percent of the paint sprayed from the spray head, can be efficiently used for painting the surface to be painted. Thus, the paint which is wasted is small and, as a result, rotary type electrostatic spray painting devices are used in various industries.

In order to form a beautifully finished painted surface, it is necessary to reduce the size of the particles of paint as much as possible. In apparatus where the paint is divided into fine particles by using the centrifugal force which results from the rotation of the spray head, such as in a rotary type spray painting device, the strength of the centrifugal force, which corresponds to the rotating speed of the spray head, has a great influence on the size of the particles of paint. In other words, the higher the rotating speed of the spray head, the smaller the size of the particles of paint. Consequently, in order to form a beautifully finished surface by using a rotary type electrostatic spray painting device, it is necessary to increase the rotating speed of the spray head as much as possible.

As mentioned above, in a conventional rotary type electrostatic spray painting device, ball bearings or roller bearings are used for supporting the rotary shaft of the electrostatic spray painting device and, in addition, a lubricant, such as grease, is confined to the area containing the ball bearings or the roller bearings. However, when grease-lubricated bearings are rotated at a high speed, the bearings instantaneously deteriorate. Therefore, a conventional rotary type electrostatic spray painting device which utilizes bearings which are lubricated by grease, has a maximum rotating speed of the rotary shaft and spray head which is at most 20,000 r.p.m. However, in known arrangements where the rotating speed of the spray head is about 20,000 r.p.m., the size of the particles of paint is relatively large and, thus, it is difficult to form a beautifully finished surface. The painting process for bodies of motor cars comprises a primary spraying step, an undercoating step, and a finish painting step. However, since it is difficult to form a beautifully finished surface by using a conventional rotary type electrostatic spray painting device, such a device is used for carrying out the undercoating step, but not the finish painting step.

One known system for lubricating ball and roller bearings injects lubricating oil of a low viscosity into the region between the inner race and the outer race of the bearing. In this manner, the friction between the ball or roller and such races is greatly reduced and, at the same time, the heat caused by the friction is absorbed by the lubricating oil. In situations where the above-mentioned jet lubricating system is applied to a rotary type electrostatic spray painting device, it is possible to increase the rotating speed of the rotary shaft of the electrostatic spray painting device over the speeds attainable where grease lubricated bearings are used. However, since the jet lubricating system requires a complicated lubricating oil feed arrangement, it is particularly difficult to apply such a jet lubricating system to a rotary type electrostatic spray painting device. In addition, if the lubricating oil mixes with the paint, the appearance of the painted surface is damaged. It is practically impossible to completely prevent the lubricating oil from leaking into the paint and, thus, it is inadvisable to apply the jet lubricating system to a rotary type electrostatic spray painting device.

A known electrostatic spray painting device which is capable of reducing the size of the particles of paint to a great extent, divides the paint into fine particles by injecting a stream of air. In this air injection type electrostatic spray painting device, since the size of the particles of sprayed paint can be reduced to a great extent, as mentioned above, it is possible to form a beautifully finished surface. Consequently, the air injection type of electrostatic spray painting device has been used for carrying out the finish painting step for the bodies of motor cars. It is a problem with known air injection type electrostatic spray painting devices that the sprayed paint impinges upon the surface to be painted together with the stream of the injection air and therefore a substantial amount of the sprayed paint escapes, together with stream of the injection air. The amount of the paint which adheres to the surface to be painted is only about 40 percent of the paint sprayed from the electrostatic spray painting device. Consequently, air injection type electrostatic spray painting suffer from the problem that the consumption of the paint is inevitably increased. A further problem occurs in that the paint which escapes with the stream of the injection air, causes air pollution within factories.

It is, therefore, an object of the present invention to provide a rotary type electrostatic spray painting device which reduces the size of the particles of paint to be sprayed and reduces the quantity of paint used.

SUMMARY OF THE INVENTION

According to the present invention, there is provided a rotary type electrostatic spray painting device which comprises a metallic housing; a metallic rotary shaft rotatably arranged in the housing and having a front end and a rear end; a cup-shaped metallic spray head fixed onto the front end of the rotary shaft and comprising a spray head supporting member which has a cylindrical outer circumferential wall, and a spray head body which has a cup-shaped inner wall and a cylindrical inner circumferential wall fitted onto the cylindrical outer circumferential wall of the spray head supporting member. The cylindrical inner circumferential wall of the spray head body has a radially inwardly projecting annular projection which is arranged at a position opposite to the cup-shaped inner wall and has a rear end face directed to the rear end of the housing; the cylindrical outer circumferential wall of the spray head supporting member having a thin extending portion which extends towards the rear end of the housing and defines an annular groove fitted onto the annular projection. The thin extending portion has a rear end which is radially outwardly bent and pressed onto the rear end face of the annular projection. Feeding means for feeding a paint onto the cup-shaped inner wall, and drive means cooperating with the rotary shaft for rotating said rotary shaft are provided. Moreover, non-contact type radial bearings are arranged in the housing to cooperate with the rotary shaft for radially supporting the rotary shaft under a non-contacting state and non-contact type thrust bearings are also arranged in the housing to cooperate with the rotary shaft for axially supporting the rotary shaft under a non-contacting state. A terminal for receiving a negative high voltage is connected to the housing, and an electrode is arranged in the housing for electrically connecting the terminal to the spray head.

The present invention may be more fully understood from the description of preferred embodiments of the invention set forth below, together with the accompanying drawings.

BRIEF DESCRIPTION OF THE DRAWINGS

In the drawings:

FIG. 6 is a side view of an alternative embodiment of a spray head according to the present invention, taken along the line VI—VI in FIG. 5, and;

FIG. 7 is a graph showing the relationship between the size of paint particles and the rotating speed of the spray head.

DETAILED DESCRIPTION OF PREFERRED EMBODIMENTS

Figure 1:
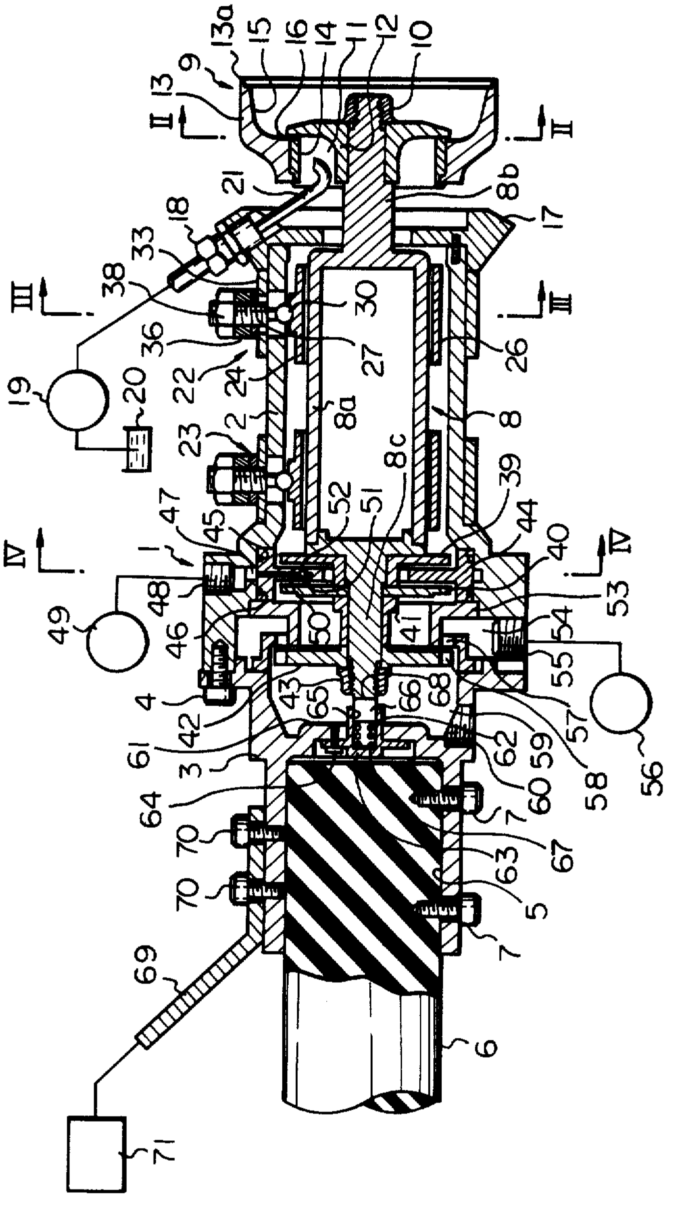
FIG. 1 is a cross-sectional side view of an embodiment of a rotary type electrostatic spray paint device according to the present invention.
Figure 2:
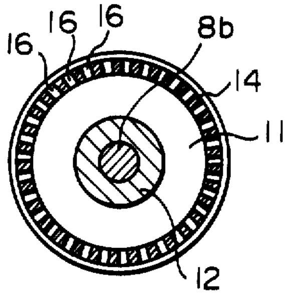
FIG. 2 is a cross-sectional view taken along the line II—II in FIG. 1.

Referring to FIG. 1, a rotary type electrostatic spray painting device, generally designated by reference numeral 1, is comprised of a generally hollow cylindrical front housing 2 made of metallic material, and a generally hollow cylindrical rear housing 3 made of metallic material. The front housing 2 and the rear housing 3 are firmly joined to each other by bolts 4. A support rod 6, made of electrical insulating material, is fitted into a cylindrical hole 5 formed in the rear housing 3, and this rear housing 3 is fixed onto the support rod 6 by bolts 7. The support rod 6 is supported by a base (not shown). A metallic rotary shaft 8 is inserted into the front housing 2. This rotary shaft 8 comprises a hollow cylindrical portion 8*a* located in the middle thereof, a shaft portion 8*b* formed in one piece on the front end of the hollow cylindrical portion 8*a*, and a shaft portion 8*c* fixed onto the rear end of the hollow cylindrical portion 8*a*. A spray head 9 made of metallic material is fixed onto the shaft portion 8*b* of the rotary shaft 8 by a nut 10. The spray head 9 comprises a spray head supporting member 12 forming therein an annular space 11, and a cup-shaped spray head body 13 fixed onto the spray head supporting member 12. As illustrated in FIGS. 1 and 2, a plurality of paint outflow bores 16, each opening into the annular space 11 and smoothly connected to an inner wall 15 of the spray head body 13, is formed in an outer cylindrical portion 14 of the spray head supporting member 12. As illustrated in FIG. 1, an end plate 17 is fixed onto the front end of the front housing 2, and a paint injector 18 is mounted on the end plate 17. The paint injector 18 is connected to a paint reservoir 20 via a paint feed pump 19, and a nozzle 21 of the paint injector 18 is directed to the cylindrical inner wall of the outer cylindrical portion 14 of the spray head supporting member 12.

Figure 3:
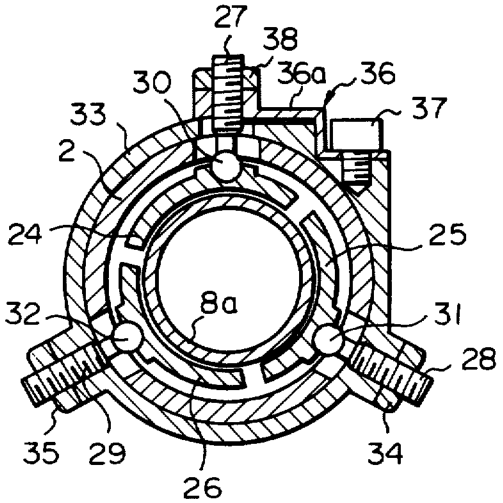
FIG. 3 is a cross-sectional view taken along the line III—III in FIG. 1.

A pair of non-contact type tilting pad radial air bearings 22 and 23 is arranged in the front housing 2, and the rotary shaft 8 is rotatably supported on the front housing 2 via a pair of the tilting pad radial air bearings 22 and 23. Both the tilting pad radial air bearings 22 and 23 have the same construction and, therefore, the construction of only tilting pad radial air bearing 22 will be hereinafter described. Referring to FIGS. 1 and 3, tilting pad radial air bearing 22 comprises three pads 24, 25, 26 spaced from the outer circumferential wall of the hollow cylindrical portion 8*a* of the rotary shaft 8 by an extremely small distance, and three support pins 27, 28, 29 supporting the pads 24, 25, 26, respectively. Spherical tips 30, 31, 32 are formed in one piece on the inner ends of the support pins 27, 28, 29, and are in engagement with spherical recesses formed on the rear faces of the pads 24, 25, 26, respectively. Consequently, the pads 24, 25, 26 can swing about the corresponding spherical tips 30, 31, 32, each functioning as a fulcrum. A bearing support frame 33 is fixed onto the outer circumferential wall of the front housing 2 by means of, for example, bolts (not shown), and the support pins 28, 29 are fixed onto the bearing support frame 33 by means of nuts 34, 35, respectively. In addition, one end of a support arm 36 having a resilient plate shaped portion 36*a* is fixed onto the bearing support frame 33 by means of a bolt 37, and the other end of the support arm 36 is fixed onto the support pin 27 by means of a nut 38. Consequently, the pad 24 is urged onto the hollow cylindrical portion 8*a* of the rotary shaft 8 due to the resilient force of the support arm 36.

Figure 4:
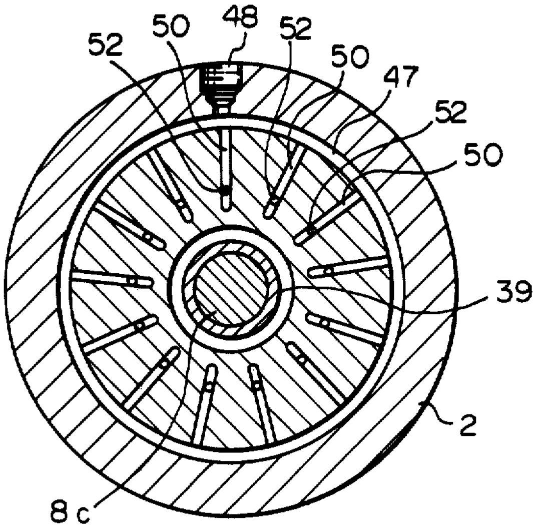
FIG. 4 is a cross-sectional view taken along the line VI—VI in FIG. 1.

Turning to FIG. 1, a pair of disc-shaped runners 39, 40 is inserted into the shaft portion 8*c* of the rotary shaft 8 and fixed onto the shaft portion 8*c* via a spacer 41 and a turbine wheel 42 by means of a nut 43. A stationary annular plate 44 is arranged between the runners 39 and 40, and the runners 39, 40 and the annular plate 44 construct a non-contact type thrust air bearing. As illustrated in FIG. 1, each of the runners 39, 40 is spaced from the annular plate 44 by a slight distance. The annular plate 44 is fixed onto the front housing 2 via a pair of O-rings 45, 46. As illustrated in FIGS. 1 and 4, an annular groove 47, extending along the outer circumferential wall of the annular plate 44, is formed on the inner wall of the front housing 2 and connected to an air feed pump 49 via a compressed air supply hole 48 which is formed in the front housing 2. A plurality of air passages 50, each extending radially inwardly from the annular groove 47, is formed in the annular plate 44. In addition, a plurality of air outflow bores 51, each extending towards the runner 40 from the inner end portion of the corresponding air passage 50, is formed in the annular plate 44, and a plurality of air outflow bores 52, each extending towards the runner 39 from the inner end portion of the corresponding air passage 50, is formed in the annular plate 44.

As illustrated in FIG. 1, a turbine nozzle holder 53 is fixed onto the front housing 2 at a position adjacent to the annular plate 44, and an annular air supply chamber 54 is formed between the turbine nozzle holder 53 and the front housing 2. The air supply chamber 54 is connected to a compressor 56 via a compressed air supply hole 55. The air supply chamber 54 comprises a compressed air injecting nozzle 57 having a plurality of guide vanes (not shown), and turbine blades 58 of the turbine wheel 42 are arranged to face the compressed air injecting nozzle 57. A housing interior chamber 59, in which the turbine wheel 42 is arranged, is connected to the atmosphere via a discharge hole 60 which is formed in the rear housing 3. The compressed air fed into the air supply chamber 54 from the compressor 56 is injected into the housing interior chamber 59 via the compressed air injecting nozzle 57. At this time, the compressed air injected from the injecting nozzle 57 provides the rotational force for the turbine wheel 42 and, thus, the rotary shaft 8 is rotated at a high speed. Then, the compressed air injected from the injecting nozzle 57 is discharged to the atmosphere via the discharge hole 60.

A through-hole 62 is formed on an end wall 61 of the rear housing 3, which defines the housing interior chamber 59, and an electrode holder 63 extending through the through hole 62 is fixed onto the end wall 61 by means of bolts 64. A cylindrical hole 65 is formed coaxially with the rotation axis of the rotary shaft 8 in the electrode holder 63, and a cylindrical electrode 66, made of wear resisting materials such as carbon, is inserted into the cylindrical hole 65 so as to be movable therein. In addition, a compression spring 67 is inserted between the electrode 66 and the electrode holder 63 so that the tip face 68 of the electrode 66 is urged onto the end face of the shaft portion 8*c* of the rotary shaft 8 due to the spring force of the compression spring 67. An external terminal 69 is fixed onto the outer wall of the rear housing 3 by means of bolts 70 and connected to a high voltage generator 71 used for generating a negative high voltage ranging from +60 kV to −90 kV. Consequently, the negative high voltage is applied to both the front housing 2 and the rear housing 3, and it is also applied to the spray head 9 via the electrode 66 and the rotary shaft 8.

As mentioned previously, the rotary shaft 8 is supported by a pair of tilting pad radial air bearings 22, 23 and a single thrust air bearing which is constructed by the runners 19, 40 and the stationary annular plate 44. In the tilting pad radial air bearings 22, 23, when the rotary shaft 8 is rotated, ambient air is sucked into the extremely small clearances formed between the hollow cylindrical portion 8*a* and the pads 24, 25, 26. Then, the air thus sucked is compressed between the hollow cylindrical portion 8*a* and the pads 24, 25, 26 due to a so-called wedge effect of air, and therefore, the pressure of the air between the hollow cylindrical portion 8*a* and the pads 24, 25, 26 is increased. As a result of this, the force radially supporting the rotary shaft 8 is generated between the hollow cylindrical portion 8*a* and the pads 24, 25, 26. On the other hand, in the above-mentioned thrust air bearing, compressed air is fed into the air passages 50 from the air feed pumps 49 via the annular groove 47. Then, the compressed air is injected from the air outflow bores 51 into the clearance between the annular plate 44 and the runner 40, and also, injected from the air outflow bores 52 into the clearance between the annular plate 44 and the runner 39. As a result of this, the pressure, which is necessary to maintain the above-mentioned clearances formed on each side of the annular plate 44, is generated between the annular plate 44 and the runners 39, 40. Consequently, the rotary shaft 8 is supported by the thrust air bearing and a pair of the radial air bearings under a non-contacting state via a thin air layer. As is known to those skilled in the art, the coefficient of viscosity of air is about one thousandth of that of the viscosity of lubricating oil. Consequently, the frictional loss in the air bearing, which uses air as a lubricant, is extremely small. Therefore, since the amount of heat caused by the occurrence of the frictional loss is extremely small, it is possible to increase the rotating speed of the rotary shaft 8 to a great extent. In the embodiment illustrated in FIG. 1, it is possible to rotate the rotary shaft 8 at a high speed of about 80,000 r.p.m.

Figure 5:
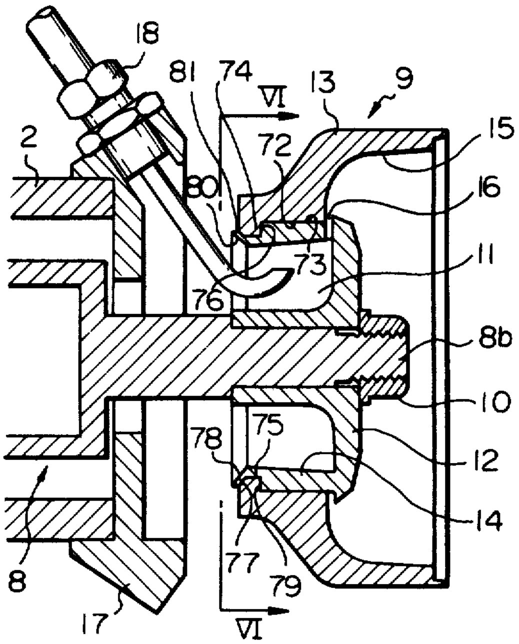
FIG. 5 is an enlarged cross-sectional side view of the spray head illustrated in FIG. 1.

As mentioned above, in the present invention, it is possible to rotate the rotary shaft 8 at a high speed of about 80,000 r.p.m. However, in the case wherein the rotary shaft 8 is rotated at such a high speed, there is a possibility that the spray head body 13 will be dislodged from the spray head supporting member 12 due to the vibration which is caused by rotating the rotary shaft 8. In order to prevent the spray head body 13 from being dislodged from the spray head supporting member 12, in the present invention, the spray head 9 has a construction capable of preventing the spray head body 13 from being dislodged from the spray head supporting member 12. That is, referring to FIG. 5, the spray head body 13 has a cylindrical inner circumferential wall 72, and this cylindrical inner circumferential wall 72 is fitted onto a cylindrical outer circumferential wall 73 of the outer cylindrical portion 14 of the spray head supporting member 12. As illustrated in FIG. 5, an annular projection 74, radially inwardly projecting from the cylindrical inner circumferential wall 72, is formed in one piece on the rear end of the cylindrical inner circumferential wall 72. The annular projection 74 has a cylindrical inner circumferential wall 75. A radially extending annular step portion 76 is formed between the cylindrical inner circumferential walls 72 and 75, and an edge, at which the annular step portion 76 intersects with the cylindrical inner circumferential wall 75 of the annular projection 74, is shaped in the form of a sharp edge. Contrary to this, an edge 77 of the annular projection 74, which is located at a position opposite to the above-mentioned sharp edge, is rounded. An annular groove 78 is formed on the rear end of the cylindrical outer circumferential wall 73 of the outer cylindrical portion 14 so as to face the annular projection 74, and the annular groove 78 has a cylindrical bottom wall. In addition, an annular step portion 79 is formed between the cylindrical bottom wall of the annular groove 78 and the cylindrical outer circumferential wall 73 of the outer cylindrical portion 14.

As illustrated in FIG. 5, the cylindrical inner circumferential wall 75 of the annular projection 74 is fitted onto the cylindrical bottom wall of the annular groove 78, and the annular step portion 76 of the annular projection 74 abuts against the annular step portion 79 of the annular groove 78, thereby positioning the spray head body 13 so that the paint outflow bores 16 are smoothly connected to the inner wall 15 of the spray head body 13. The outer cylindrical portion 14 has a thin extending portion 80 passing through the annular projection 74 and projecting backward from the annular projection 74, and an annular rear end 81 of the thin extending portion 80 is radially outwardly bent and pressed onto the rear end face of the annular projection 74. Consequently, since the annular projection 74 is firmly held between the annular rear end 81 and the annular step portion 79, the axial movement of the spray head body 13 is completely prevented and, therefore, it is possible to completely prevent the spray head body 13 from being dislodged from the spray head supporting member 12. In addition, as mentioned above, the edge 77 of the annular projection 74 is rounded so that the annular rear end 81 of the thin extending portion 80 can be easily bent. In addition, as illustrated in FIG. 5, the inner wall of the outer cylindrical portion 14 is shaped in the form of a slightly tapered conical wall. However, instead of forming the outer cylindrical portion 14 so that it has a conical inner wall, the inner wall of the outer cylindrical portion 14 may be shaped in the form of a cylindrical inner wall which coaxially extends about the rotation axis of the rotary shaft 8.

In the embodiment illustrated in FIG. 5, the rear end 81 of the thin extending portion 80, which is bent, has an annular shape. However, instead of forming the rear end 81 so that it has an annular shape, as illustrated in FIG. 6, a plurality of tongue members 82, which are formed in one piece on the rear end of the thin extending portion 80 of the outer cylindrical portion 14 and project backward from the thin extending portion 80, may be radially outwardly bent and pressed onto the rear end face of the annular projection 74.

In operation, paint is injected from the nozzle 21 of the paint injector 18 onto the circumferential inner wall of the outer cylindrical portion 14 of the spray head supporting member 12. Then, the paint, injected onto the circumferential inner wall of the outer cylindrical portion 14, flows out onto the inner wall 15 of the spray head body 13 via the paint outflow bores 16 due to the centrifugal force caused by the rotation of the spray head 9. After this, the paint spreads on the inner wall 15 of the spray head body 13 and flows on the inner wall 15 in the form of a thin film. Then, the paint reaches the tip 13*a* of the spray head body 13. As mentioned previously, a negative high voltage is applied to the spray head 9. Consequently, when the paint is sprayed from the tip 13*a* of the spray head body 13 in the form of fine particles, the particles of the sprayed paint are charged with electrons. Since the surface to be painted is normally grounded, the paint particles charged with electrons are attracted towards the surface to be painted due to electrostatic force and, thus, the surface to be painted is painted.

FIG. 7 illustrates the relationship between the size of the particles of sprayed paint and the rotating speed of the spray head in the case wherein the spray head 9 (FIG. 1) having a diameter of 75 mm is used. In FIG. 7, the ordinate S.M.D. indicates the mean diameter (μm) of paint particles, which is indicated in the form of a Sauter mean diameter, and the abscissa N indicates the number of revolutions per minute (r.p.m.) of the spray head 9. As mentioned previously, in a conventional rotary type electrostatic spray painting device, the maximum number of revolutions per minute N of the spray head is about 20,000 r.p.m. Consequently, from FIG. 7, it will be understood that, if the spray head having a diameter of 75 mm is used in a conventional rotary type electrostatic spray painting device, the minimum mean diameter S.M.D. of paint particles is in the range of 55 μm to 65 μm. Contrary to this, in the present invention, the maximum number of revolutions per minute N is about 80,000 r.p.m. Consequently, from FIG. 7, it will be understood that the paint can be divided into fine particles to such a degree that the mean diameter S.M.D. of paint particles is in the range of 15 μm to 20 μm. Therefore, it will be understood that, in a rotary type electrostatic spray painting device according to the present invention, the size of paint particles can be greatly reduced, as compared with that of paint particles in a conventional rotary type spray painting device. In addition, as mentioned previously, the same negative high voltage is applied to the housings 2, 3 and the rotary shaft 8. Consequently, there is no danger that an electric discharge will occur between the housings 2, 3 and the rotary shaft 8.

According to the present invention, since the spray head can be rotated at a high speed of about 80,000 r.p.m., the size of the particles of sprayed paint can be reduced to a great extent. As a result of this, the size of paint particles becomes smaller than that of paint particles obtained by using a conventional air injection type electrostatic spray painting device. Consequently, in the present invention, it is possible to obtain an extremely beautiful finished surface and, therefore, a rotary type electrostatic spray painting device can be used for carrying out a finish painting step in the paint process of, for example, the bodies of motor cars. In addition, in the present invention, since paint particles are created by rotating the spray head at a high speed, but are not created by air injection, the amount of the paint used to effectively paint the surface to be painted is about 90 percent of the amount of the paint sprayed from a rotary type electrostatic spray painting device. Consequently, since a large part of the sprayed paint is not dispersed within the factory, it is possible to prevent the problem of air pollution from arising. In addition, the amount of paint used can be reduced. Furthermore, even if the spray head is rotated at a high speed of about 80,000 r.p.m., there is no danger that the spray head body will be dislodged from the spray head supporting member.

While the invention has been described by reference to specific embodiments chosen for purposes of illustration, it should be apparent that numerous modifications could be made thereto by those skilled in the art without departing from the basic concept and scope of the invention.

We claim:

1. A rotary type electrostatic spray painting device comprising:

a metallic housing;

a metallic rotary shaft rotatably arranged in said housing and having an axis of rotation, a front end, and a rear end;

a cup-shaped metallic spray head fixed onto said front end of said rotary shaft and comprising a spray head supporting member which has a cylindrical outer circumferential wall, and a spray head body which has a cup-shaped inner wall and a cylindrical inner circumferential wall fitted onto said cylindrical outer circumferential wall of said spray head supporting member, said cylindrical inner circumferential wall of said spray head body having a radially inwardly projecting annular projection which is arranged at a location which is rearwardly distal with respect to said cup-shaped inner wall and has a rear end face directed to said rear end of said metallic housing, said cylindrical outer circumferential wall of said spray head supporting member having a thin extending portion which extends towards said rear end of said metallic housing and defines at least a portion of an annular groove fitted onto said annular projection, said thin extending portion having a rear end which is radially outwardly bent onto said rear end face of said annular projection for securing said spray head body to said spray head supporting member;

feeding means for feeding a paint onto said cup-shaped inner wall;

drive means cooperating with said metallic rotary shaft for rotating said metallic rotary shaft;

non-contact type radial bearing means arranged in said metallic housing and cooperating with said metallic rotary shaft for radially supporting said metallic rotary shaft under a non-contacting state;

non-contact type thrust bearing means arranged in said metallic housing and cooperating with said metallic rotary shaft for axially supporting said metallic rotary shaft under a non-contacting state;

terminal means for receiving a negative high voltage, said terminal means being connected to said metallic housing, and;

electrode means arranged in said metallic housing and electrically connecting said terminal means and said cup-shaped metallic spray head.

2. A rotary type electrostatic spray painting device as claimed in claim 1, wherein said rear end of said thin extending portion has an annular shape.

3. A rotary type electrostatic spray painting device as claimed in claim 1, wherein said rear end of said thin extending portion comprises a plurality of tongue members.

4. A rotary type electrostatic spray painting device as claimed in claim 1, wherein said rear end face of said annular projection has an outer peripheral edge which is rounded.

5. A rotary type electrostatic spray painting device as claimed in claim 1, wherein said annular projection has an annular step portion located distal with respect to said rear end face of said annular projection, and said annular groove has an annular step portion which is in contact with said annular step portion of said annular projection.

6. A rotary type electrostatic spray painting device as claimed in claim 1, wherein said spray head supporting member comprises a generally cylindrical inner wall coaxially arranged with said axis of rotation of said metallic rotary shaft and defining therein an annular space, and a plurality of paint outflow bores formed on said generally cylindrical inner wall and smoothly connected to said cup-shaped inner wall of said spray head body, said feeding means having a paint injection nozzle which is arranged in said annular space.

7. A rotary type electrostatic spray painting device as claimed in claim 1, wherein said non-contact type radial bearing means comprises a pair of radial air bearings.

8. A rotary type electrostatic spray painting device as claimed in claim 7, wherein each of said radial air bearings comprises a bearing frame connected to said metallic housing, a plurality of pads, each having an inner face which extends along a circumferential outer wall of said metallic rotary shaft and spaced from said circumferential outer wall of said metallic rotary shaft by a slight distance, and a plurality of support pins, each being connected to said bearing frame and pivotally supporting said corresponding pad.

9. A rotary type electrostatic spray painting device as claimed in claim 8, wherein each of said radial air bearings further comprises a resilient arm through which one of said support pins is connected to said bearing frame for biasing said corresponding pad to said circumferential outer wall of said metallic rotary shaft.

10. A rotary type electrostatic spray painting device as claimed in claim 8, wherein each of said pads has an outer wall forming a spherical recess thereon, each of said support pins having a spherical tip which is in engagement with said spherical recess of said corresponding pad.

11. A rotary type electrostatic spray painting device as claimed in claim 1, wherein said non-contact type thrust bearing means comprises a thrust air bearing.

12. A rotary type electrostatic spray painting device as claimed in claim 11, wherein said non-contact type thrust bearing means further comprises an air inlet for receiving compressed air, said thrust air bearing comprising a stationary annular plate having opposed side walls, and a pair of runners fixed onto said metallic rotary shaft and arranged on each side of said annular plate, each of said runners being spaced from the corresponding side wall of said annular plate, a plurality of air outflow bores connected to said air inlet being formed on the opposed side walls of said annular plate.

13. A rotary type electrostatic spray painting device as claimed in claim 12, wherein said annular plate forms therein a plurality of radially extending air passages, each connecting said corresponding air outflow bore to said air inlet.

14. A rotary type electrostatic spray painting device as claimed in claim 1, wherein said electrode means comprises an electrode which is arranged to continuously contact with said rear end of said metallic rotary shaft.

15. A rotary type electrostatic spray painting device as claimed in claim 14, wherein said electrode is made of carbon.

16. A rotary type electrostatic spray painting device as claimed in claim 14, wherein said rear end of said metallic rotary shaft has a flat end face extending perpendicular to said axis of rotation of said metallic rotary shaft, said electrode being arranged coaxially with said axis of rotation of said rotary shaft and having a flat end face which is in contact with said flat end face of said rear end of said metallic rotary shaft.

17. A rotary type electrostatic spray painting device as claimed in claim 14, wherein said electrode means further comprises an electrode holder fixed onto said metallic housing and having therein a cylindrical hole, into which said electrode is slidably inserted, and a compression spring arranged in the cylindrical hole of said electrode holder between said electrode holder and said electrode.

18. A rotary type electrostatic spray painting device as claimed in claim 1, wherein said drive means comprises a compressor, an air injection nozzle arranged in said housing and connected to said compressor, and a turbine wheel fixed onto said rotary shaft and having a turbine blade which is arranged to face said air injection nozzle.

* * * * *